United States Patent [19]

Eckle

[11] 4,392,761
[45] Jul. 12, 1983

[54] ROTARY MACHINING TOOLS WITH SIDE COOLANT DELIVERY

[75] Inventor: Otto Eckle, Loechgau, Fed. Rep. of Germany

[73] Assignee: Komet Stahlhalter- und Werkzeugfabrik Robert Breuning GmbH, Besigheim, Fed. Rep. of Germany

[21] Appl. No.: 251,039

[22] Filed: Apr. 6, 1981

[30] Foreign Application Priority Data

May 13, 1980 [DE] Fed. Rep. of Germany ... 8012959[U]

[51] Int. Cl.³ .................. B23B 27/10; B23B 51/06; B23B 5/22; B23B 5/34
[52] U.S. Cl. .................................... 408/59; 279/20
[58] Field of Search .............. 29/64, 65, 66, 67; 279/20; 408/57, 59, 703, 705; 409/135, 136

[56] References Cited

U.S. PATENT DOCUMENTS

| | | | |
|---|---|---|---|
| 2,511,495 | 6/1950 | Crot | 279/20 |
| 2,772,897 | 12/1956 | Shaw et al. | 279/20 |
| 2,777,702 | 1/1957 | Rodal | 279/20 |
| 2,933,321 | 4/1960 | Cascone | 279/20 |
| 2,946,244 | 7/1960 | Maynard | 279/20 |
| 2,985,468 | 5/1961 | Shaw et al. | 279/20 |
| 3,024,030 | 3/1962 | Koch | 279/20 |
| 3,364,800 | 1/1968 | Benjamin et al. | 279/20 |

FOREIGN PATENT DOCUMENTS 615224 5/1935 Fed. Rep. of Germany ........ 279/20
502151 3/1971 Switzerland .

*Primary Examiner*—Robert E. Garrett
*Assistant Examiner*—Paul M. Heyrana, Sr.
*Attorney, Agent, or Firm*—Flynn, Thiel, Boutell & Tanis

[57] ABSTRACT

An apparatus for supplying a fluid to a passageway in a cutting tool includes a housing having a rotatable spindle thereon, the tool being releasably supported on the spindle for rotation therewith. A cooling medium supply ring rotatably supported on a shank portion of the tool has a first surface which faces substantially radially outwardly and slightly in the direction of rotation of the tool. A coupling head on the housing has a second surface thereon positioned for sealing engagement with the first surface when they are brought into angular alignment through rotation of the supply ring caused by frictional engagement of the supply ring and rotating tool. Fluid passes from a passageway in the coupling head through aligned openings in the first and second surfaces, into passageways in the supply ring, and then through an opening in the shank portion of the tool and into the passageway therein.

18 Claims, 4 Drawing Figures

ROTARY MACHINING TOOLS WITH SIDE COOLANT DELIVERY

FIELD OF THE INVENTION

The invention relates to an arrangement for supplying a cooling medium to rotary metal-machining cutting tools, particularly boring tools, provided with cooling medium ducts, comprising a cooling medium supply ring which is mounted on and sealed with respect to a cylindrical tool shank, which cooling medium supply ring can be connected outwardly via a releasable coupling with a stationary supply pipe and is connected inwardly via an annular duct with cooling medium bores in the shank of the tool. The tool can be inserted in a drive spindle mounted in a housing, in which there is connected to the housing a coupling head which is arranged in the vicinity of the cooling medium supply ring, is in permanent communication with the supply pipe and has an outlet bore extending substantially radially with respect to the axis of rotation of the tool shank and extending into a first sealing surface and in which the cooling medium supply ring has a second sealing surface which cooperates with and is arranged to fit against the first sealing surface and into which extends a substantially radially extending inlet bore connected to the annular duct.

BACKGROUND OF THE INVENTION

In one such known device (Swiss patent specification No. 502 151) the cooling medium supply ring is rigidly mounted on the boring tool. In cases where boring tools of various different working diameters are provided, it is always of the same diameter. In each case, the same coupling head can be fitted axially over the cooling medium supply ring, this coupling head having a cylindrical bore the diameter of which corresponds to the outside diameter of the cooling medium supply ring and the wall surface of which forms the first sealing surface. The outer surface of the cooling medium supply ring forms the second sealing surface. When the boring tool is interchanged with another boring tool, the coupling head is withdrawn axially from the previously used boring tool and pushed over the new boring tool. In the case of machines with which a plurality of like holes are bored one after another, no serious problems arise.

At the present time, however, it is not uncommon for a number of mechining operations to be carried out one after the other on the same workpiece using various different tools on universal machine tools which are usually referred to as "machining centers." In such a machining center, a plurality of tools are fed in succession from an external tool magazine, by means of a conveying device, to the working spindle and are also conveyed back again from the latter, the interchange of the tools being effected automatically. Very few of the machining centers which are in use at present, however are provided with a cooling medium supply means whereby the rotating cutting tool could be supplied with the cooling medium through the drive spindle. The fitting of rotary cutting tools of the kind initially referred to, which are provided with a cooling medium supply ring, would give rise to difficulties in the case of machining centers, since this cannot be done automatically because of the necessary feed tubes. The previously known device for the supply of cooling medium that was referred to initially is also unsuitable for such machining centers, since the removal and axial mounting of the coupling head for each successive tool would be time-consuming and would require complicated operating mechanisms.

Devices for supplying cooling medium to boring tools are also known in which the cooling medium supply ring is rotatably mounted on the shank of the boring tool. The cooling medium supply ring is in addition held against axial displacement by two spring rings, which engage in annular grooves formed in the tool shank, one in front of and one behind the cooling medium supply ring. In this case, the cooling medium supply ring has a radial base in which the coupling head connected to the supply pipe can be inserted and retained by a spring clip. Even in this case difficulties are encountered in machining centres when the tools are frequently changed, since the insertion of the coupling head into the radial bore and the fixing thereof in the bore cannot be carried out fully automatically by simple means.

The problem that lies at the root of the invention is to provide an arrangement for supplying a cooling medium to rotary metal-machining cutting tools, particularly for boring tools of the kind initially referred to which, even with machining centers, enables a cooling medium to be suplied to the cutting tools via a cooling medium supply ring, in which the cooling medium supply ring is automatically connected to the coupling head without the aid of additional operating mechanisms after the cutting tool has been fitted and is also automatically disconnected during tool changing. The arrangement according to the invention will also be suitable in addition for subsequent incorporation in already existing machining centres.

SUMMARY OF THE INVENTION

This problem is solved according to the invention in that the cooling medium supply ring is rotatably supported on the tool shank and has a radially projecting coupling piece which is formed with the second sealing surface; that both sealing surfaces are flat; that the first sealing surface is inclined in the circumferential direction of the cooling medium supply ring at an acute angle $\alpha$ to from 2° to 10° with respect to a tangent to a circle concentric with the axis of the tool shank, which tangent extends through the outlet bore, so that the distance between the first sealing surface and the axis of the tool shank is progressively reduced in the direction of rotation of the tool; that the first sealing surface, in the general direction of the axis of the tool shank, either extends parallel to this axis or diverges therefrom in the direction towards the free end of the tool at an acute angle $\beta$ of up to 10°; and that the second sealing surface conforms in its inclination with the inclination of the first sealing surface.

In this arrangement, the disengageable coupling accordingly consists of a coupling head which is arranged so as to be stationary on the housing and a coupling piece connected with the cooling medium supply ring on the tool shank. The coupling head and the cooling piece are provided with flat cooperating sealing surfaces which are arranged in the particular manner described above. The cutting tool can be inserted into the working spindle from the automatically operating tool changes of a machining center so that the cooling medium supply ring can be located in any desired angular position in relation to the tool spindle. When the tool begins to rotate, the cooling medium supply ring is entrained for rotation in the same direction as the cutting tool by the friction between the shank of this tool and the cooling medium supply ring. As a result, the sealing surface of the coupling piece comes into engagement with the sealing surface of the coupling head. Since both sealing surfaces are disposed at an acute angle to a tangent, they are forced into sealing engagement with each other by the rotation of the cutting tool. Thus, a fully automatic coupling and uncoupling of the cooling medium supply ring with respect to the stationary cooling medium supply means is achieved by simple means. During subsequent interchanging of the rotary cutting tool with another such tool, the rotary cutting tool is merely retracted axially from the drive spindle by the tool changing device, so that the coupling piece is automatically disengaged from the coupling head.

A crucial advantage of the arrangement according to the present invention consists in the fact that it can be incorporated subsequently in existing machine centers, so that boring tools with replaceable hard metal cutting plates which have recently come into general use can be employed at these machining centers.

BRIEF DESCRIPTION OF THE DRAWINGS

The invention will now be described by way of example with reference to the accompanying drawings, in which.

DETAILED DESCRIPTION

Figure 1:
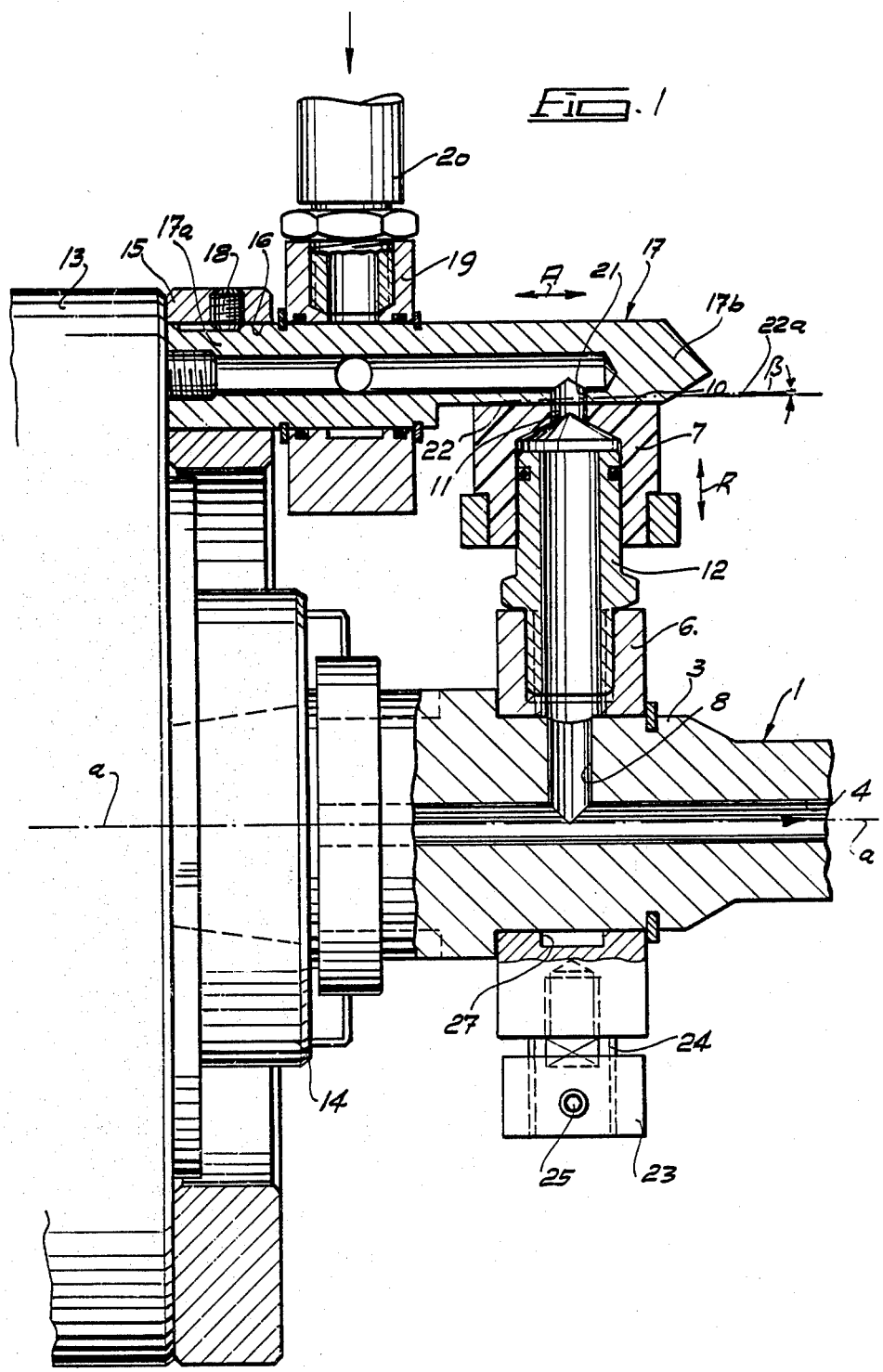
FIG. 1 is a longitudinal section of a first embodiment of a device according to the invention, taken on the line I—I of FIG. 2.
Figure 2:
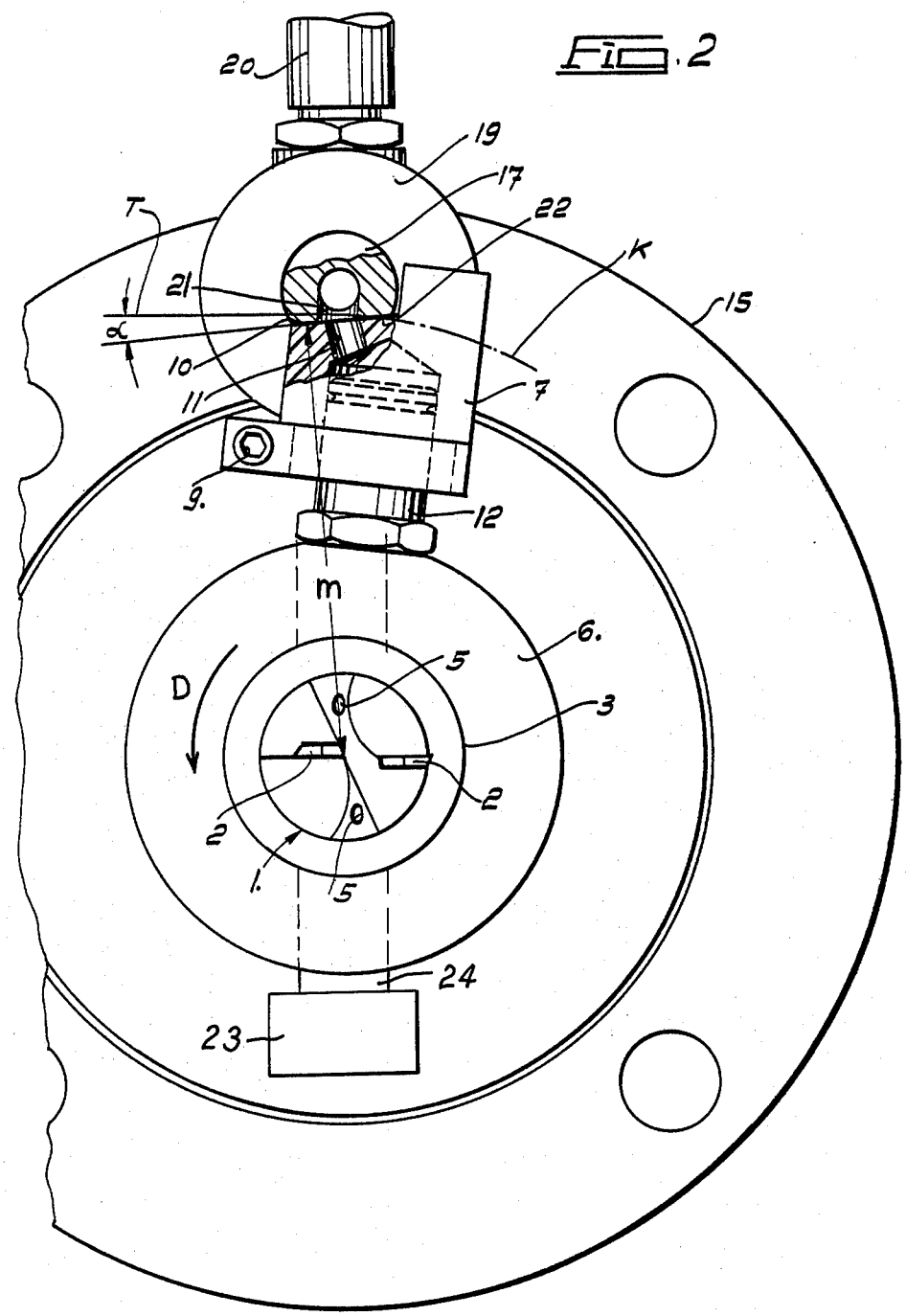
FIG. 2 is a fragmentary end elevation of this device.

Referring to FIGS. 1 and 2, the boring tool 1 is provided at its free end with two interchangeable hard metal cutting plates 2. The shank 3 of the boring tool 1 has a central bore 4 for the passage of a cooling medium, which bore terminates, at the leading end of the boring tool, in two openings 5. Cooling medium is supplied through the bore 4 and the openings 5 directly to the region of the cutting plates 2. Instead of a liquid cooling medium, it may in some cases, be necessary to supply compressed air through the bore 4 and openings 5.

On the cylindrical shank 3 of the boring tool 1 is rotatably mounted a cooling medium supply ring 6 which is formed with an annular duct 27 connected to the cooling medium bore 4 by a transverse bore 8. By providing an accurate fit between the cooling medium supply ring 6 and the shank 3 of the tool, these two parts are sealed with respect to each other. The cooling medium ring 6 is provided with a radially projecting coupling piece 7. This coupling piece 7 is slidable radially in the direction R over a nipple 12 screwed into the cooling medium ring 6 and can be secured by means of a clamping screw 9 (FIG. 2). The coupling piece 7 has in addition a flat sealing surface 10 into which a substantially radially extending inlet bore 11 extends. This inlet bore 11 is connected with a bore through the nipple 12 and, via the latter, with the transverse bore 8.

Rotatably mounted in a housing 13 of a working center is a drive spindle 14. A supporting ring 15 may be subsequently fixed to the housing coaxially with the spindle 14. This supporting ring 15 has an axially extending bore 16 in which the shaft 17a of a coupling head 17 is slidable in the direction A parallel to the axis a—a of the shank 3 and can be secured by means of a screw 18. The axis a—a of the shank 3 is coaxially aligned with the central axis of the drive spindle 14 as soon as the boring tool 1 is inserted in the drive spindle 14.

On the shaft 17a of the coupling head 17 there is additionally rotatably mounted a coupling ring 19 to which is connected a supply pipe 20 for the cooling medium. The rotatable arrangement of the coupling ring 19 has been chosen in order to provide an arrangement which is as adaptable as possible. If desired, the supply pipe 20 could instead be fixedly connected to the shaft 17a.

The coupling head 17 projects into the region radially outside the cooling medium supply ring 6 and in this region is provided with a substantially radially inwardly extending cooling medium outlet bore 21. This cooling medium outlet bore 21 is either located in the same radial plane as the cooling medium inlet bore 11 or may be brought into the same radial plane as the latter by axial adjustment of the coupling head 17.

The coupling head 17 is also provided with a flat sealing surface 22. The outlet bore 21 extends into this sealing surface 22. The sealing surface 22 is inclined, circumferentially of the cooling medium supply ring 6, with respect to a tangent line T (FIG. 2) extending through the outlet bore 21 approximately perpendicular thereto. In this case, it is a line question of a tangent to a circle K which is concentric with the axis a—a of the tool shank 3. The inclination of the sealing surface 22 circumferentially with respect to the tangent line T is at an acute angle $\alpha$ of about 2° to 10°, preferably 6° to 8°. The circumferential inclination of the sealing surface 22 is moreover such that the distance m thereof from the axis a—a of the spindle 3 becomes progressively less in the rotational direction D of the boring tool.

The sealing surface 22, in the example shown, extends, in the direction of the axis a—a of the tool shank 3, parallel to the axis. If desired, however, the sealing surface could instead be inclined, as shown by the chain-dotted line 22a, toward the free end of the boring tool and away from the axis of the tool shank at an acute angle $\beta$, which angle may be as large as 10°. The sealing surface 10 of the coupling piece 7 is inclined in the same directions and at the same angle as the sealing surface 22, so that the two sealing surfaces 10, 22 can, in the coupled condition, lie parallel to and in contact with each other in a good sealing relationship.

The boring tool is inserted in the drive spindle 14, together with the cooling medium supply ring which is arranged thereon so as to be freely rotatable, by means of a tool changer, the coupling piece 7 being disposed at any desired angle with respect to the coupling head 17. When rotation is imparted to the boring tool 1 by the drive spindle 14, the cooling medium supply ring 6 will also be caused to rotate by the friction between the tool shank 3 and the said ring 6 until the sealing surface 10 of the coupling piece 7 comes into engagement with the sealing surface 22 of the coupling head 17. In connection with the choice of the angle $\alpha$, it is important that this angle should be neither too great not too small, so that a predetermined contact pressure between the two sealing surfaces 10, 22 will be attained. On the one hand, this contact pressure must be small enough to ensure that the stream of cooling medium discharged from the outlet bore 21 will not force the two coupling parts 7, 17 apart from each other. On the other hand, the angle $\alpha$ must not be too small to ensure that the sealing surfaces 10, 22 will also assume the correct relative position in which the two bores 11, 21 are in alignment with each other. Also, that edge of the coupling piece 7 which is the leading edge in relation to the direction of rotation should not be prematurely jammed against the coupling head 17. An angle of from 6° to 8° has thus proved to be the most suitable in this connection. A positive adjustment of the relative position of the sealing surfaces 10, 22 can also be effected by radially adjusting the coupling piece 7 after loosening the screw 9.

If the angle $\beta$ is made greater than 0°, a locking of the coupling piece 7 and the coupling head on the withdrawal of the boring tool 1 from the drive spindle 14, should the boring tool not be withdrawn exactly in the axial direction, will be avoided.

Further, it is advantageous if the free end 17b of the coupling head 17 is made conical or wedge-shaped. Due to this wedge-shaped construction, the coupling piece 7, on insertion of the boring tool 1 into the drive spindle 14, will be displaced in the direction of rotation or in the direction opposite to the direction of rotation if it should by chance strike directly against the coupling head 17.

For boring tools, the axis a—a of the shank of which extends horizontally in operation, it is furthermore advantageous to mount a counter-weight 23 on the cooling medium supply ring 6 diametrically opposite the coupling piece 7, which counter-weight should advantageously be radially adjustable. The radial adjustability may for example result from the counterweight 23 having a female screw-thread and being capable of being screwed on a screw-threaded stud 24. A securing screw 25 prevents undesired rotation of both of these parts. By means of the counterweight 23, the weight of the coupling piece 7 is balanced, so that even a small amount of friction between the tool shank 3 and the cooling medium supply ring 6 is sufficient to cause the latter to be rotationally entrained when the boring tool 1 is rotating. If no counter-weight 23 is provided, the coupling piece 7 may in certain circumstances be too heavy to be entrained for rotation in the direction D from a downwardly hanging position. In the case of vertically arranged boring tools, a counter-weight may be dispensed with.

Figure 3:
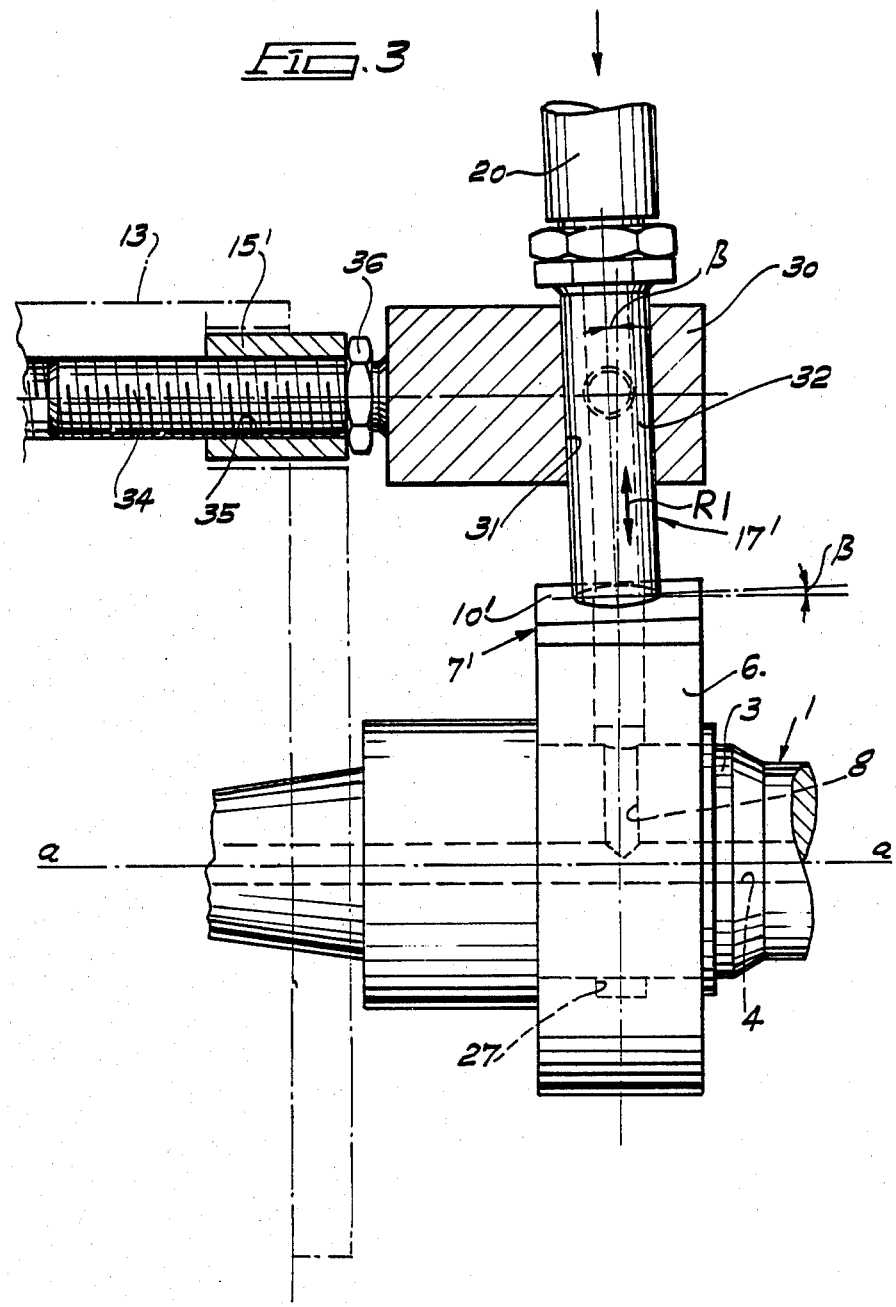
FIG. 3 is a longitudinal section of a second embodiment, taken on the line III—III in FIG. 4.
Figure 4:
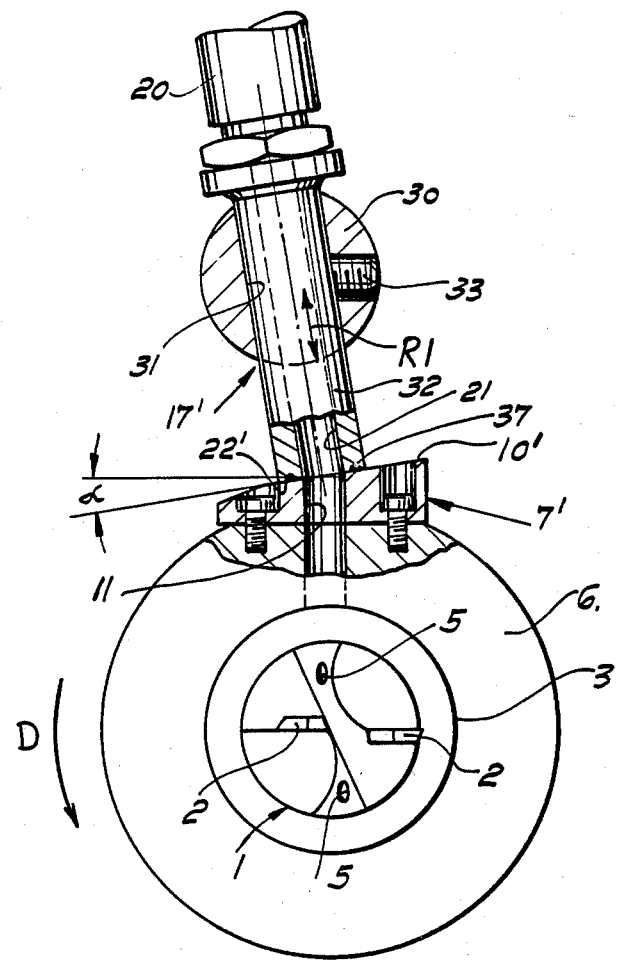
FIG. 4 is a partly sectioned end elevation of the embodiment according to FIG. 3.

A second advantageous embodiment is illustrated in FIGS. 3 and 4. In so far as the parts thereof have the same function as in the first constructional embodiment, they are indicated by the same references. The above description is correspondingly applicable.

In the embodiment illustrated in FIGS. 3 and 4, the coupling piece 7' is secured by screws directly onto the outer circumference of the cooling medium supply ring. The coupling head 17' advantageously consists of a holder 30, which is adjustable axially with respect to the axis a—a of the tool shank 3 and a tube 32 which is slidable in a transverse bore 31 in the holder 30. The tube 32 can be clamped tight in the transverse bore 31 by means of a clamping screw 33. The tube 32 can thus be adjusted approximately in the radial direction R1, exactly at right angles to the two sealing surfaces 10' and 22'.

For the axial adjustment of the coupling head 17', the holder 30 may have a screw-threaded stud 34 extending parallel to the axis a—a of the tool shank 3, which stud can be screwed into a female screw-threaded bore 35 provided in the supporting ring 15' and can be fixed in position by means of a lock nut 36. After loosening the lock nut 36, the holder 30 can be adjusted by rotating it about its own central axis, whereby the indication of the sealing surface 22' of the tube 32 can at the same time be adjusted to suit that of the sealing surface 10' of the coupling piece 7'. As regards the positions of the sealing surfaces 10' and 22' relatively to the central axis a—a of the tool shank 3, the information given in connection with the embodiment according to FIGS. 1 and 2 applies correspondingly. In the embodiment illustrated in FIGS. 3 and 4, the two sealing surfaces 7' and 22' are inclined towards the free end of the boring tool and away from the axis a—a of the tool shank 3 at an acute angle $\beta$ of about 2°. The central axis of the tube 22 is also correspondingly inclined at the angle $\beta$ with respect to a radial plane at right angles to the said axis a—a.

The manner in which this embodiment operates when changing tools is the same as in the embodiment described previously. The flat end surface of the tube 32 at the same time constitutes the first sealing surface 22'.

In order to improve the sealing action between the two sealing surfaces 10' and 22' still further, an O-ring 37 may be arranged in a seating or annular recess in the flat sealing surface 22' of the coupling head 17'-which surface in this case is the lower end surface of the tube 32—the O-ring surrounding the outlet bore 21 of the said tube 32 and projecting only slightly from the flat sealing surface 22'.

The device according to the invention for supplying cooling medium is suitable for every kind of rotary cutting tool which operate with a cooling medium, and hence not only for boring tools but also, for example, for milling cutters, boring bars and inside turning tools.

What I claim is:

1. An arrangement for supplying a cooling medium to a rotating metal-machining cutting tool provided with cooling medium ducts which communicate with cooling medium bores provided in a cylindrical shank thereof, including a cooling medium supply ring which is supported on and sealed with respect to said cylindrical shank of said tool, can be connected radially outwardly by releasable coupling means with stationary cooling medium supply means and is connected radially inwardly by an annular duct with said cooling medium bores in said shank of said tool, said shank of said tool being receivable in a drive spindle rotatably supported in a housing, said releasable coupling means including a coupling head which is supported near said cooling medium supply ring, is in permanent communication with said supply means and has an outlet bore extending substantially radially with respect to the axis of rotation of said tool shank into a generally radially inwardly facing first sealing surface thereof, and wherein said cooling medium supply ring has a second sealing surface which cooperates with and is arranged to sealingly engage said first sealing surface and in which is provided a substantially radially extending inlet bore connected to said annular duct, the improvement comprising wherein said cooling medium supply ring is rotatably supported on said tool shank and has a radially projecting coupling piece which has thereon said second sealing surface; wherein both said first and second sealing surfaces are substantially flat; wherein said first sealing surface is inclined, in the circumferential direction of said cooling medium supply ring at an acute angle of from 2° to 10° with respect to a line tangent to a circle which is concentric with the axis of said tool shank, which tangent line extends through said outlet bore approximately perpendicular thereto, wherein the distance between said first sealing surface and the axis of said tool shank decreases progressively in the direction of rotation of said tool; wherein said first sealing surface, in the general direction of the axis of said tool shank, diverges in a direction toward a free end of said tool at an acute angle of from 0° to 10°, inclusive; and wherein said second sealing surface has substantially the same inclination as said first sealing surface.

2. A device according to claim 1, wherein both of said sealing surfaces are inclined in said circumferential direction at an angle of from 6° to 8°.

3. A device according to claim 1, wherein said coupling head is adjustable in the direction of the axis of said tool shank.

4. A device according to claim 1, wherein said coupling piece is adjustable in a direction substantially radial with respect to the axis of said tool shank.

5. A device according to claim 1, wherein a free end of said coupling head is made conical or wedge-shaped at its full end has a shape which is one of a cone and a wedge.

6. A device according to claim 1, wherein said cooling medium supply ring has a counter-weight supported thereon at a location diametrically opposite said coupling piece.

7. A device according to claim 6, wherein said counter-weight is adjustable radially of the axis of said tool shank.

8. A device according to claim 1, wherein said coupling piece is a flexible synthetic material.

9. A device according to claim 1, wherein said coupling head is adjustable in an approximately radial direction with respect to the axis of said tool shank.

10. A device according to claim 3, wherein said coupling head is adjustable in a direction substantially radially of the axis of said tool shank, and wherein said coupling head includes a tube which is supported for adjustment in a substantially radial direction in a holder which is axially adjustably supported.

11. A device according to claim 10, wherein said direction of substantially radial adjustment of said tube is perpendicular to said first sealing surface.

12. A device according to claim 10, wherein said tube is slidable in a transverse bore provided in said holder and can be releasably secured in a selected position by clamping means.

13. A device according to claim 10, wherein said holder has a screw-threaded stud which extends parallel to the axis of said tool shank, can be screwed into a supporting ring connected to said housing and can be releasably secured in position by means of a lock nut thereon.

14. A device according to claim 1, including an O-ring concentrically surrounding said outlet bore in said coupling head and arranged in a recess in said second sealing surface.

15. An apparatus for supplying a fluid to a fluid passageway in a cutting tool, comprising a housing, a spindle supported on said housing for rotation about an axis, means for driving said spindle in a first rotational direction, said tool having a shank portion of generally circular cross section and an opening in said shank portion in fluid communication with said passageway therein, means for releasably supporting said tool on said spindle for rotation therewith, said shank portion of said tool being substantially coaxial with said axis, a cooling medium supply ring encircling and rotatably supported on said shank portion of said tool, having means defining a first surface thereon which faces substantially radially outwardly and slightly in said first rotational direction, and having means defining an opening in said first surface, said cooling medium supply ring having passageway means providing fluid communication between said opening in said first surface and said opening in said shank portion of said tool, means for yieldably resisting rotation of said cooling medium supply ring relative to said tool, a coupling head supported on said housing and having means defining a second surface which faces substantially radially inwardly and slightly in a direction opposite said first rotational direction, said second surface being axially aligned with said first surface and sealingly engageable therewith when said first and second surfaces are angularly aligned, rotation of said tool relative to said housing causing said rotation resisting means to rotate said cooling medium supply ring into a position in which said first and second surfaces sealingly engage, said engagement of said first and second surfaces preventing further rotation of said cooling medium supply ring relative to said housing, said tool thereafter rotating within said cooling medium supply ring and said rotation resisting means thereby maintaining said sealing engagement of said first and second surfaces, and said coupling head having an opening in said second surface and means for supplying a fluid thereto, said openings in said first and second surfaces being in fluid communication when said first and second surfaces are sealingly engaged.

16. The apparatus according to claim 15, wherein said first and second surfaces diverge away from said axis at an acute angle in a direction away from said spindle.

17. The apparatus of claim 16, wherein said first and second surfaces are each substantially planar.

18. The apparatus of claim 15, wherein an end of said coupling head remote from said housing has the shape of one of a wedge and a cone.

* * * * *